May 8, 1962     E. S. SAMPSON     3,033,991
NON-CONTACTING CROP SHEAR DETECTOR

Filed Dec. 29, 1959     8 Sheets-Sheet 1

*Fig. 1*

Inventor
Ernest S. Sampson,
by Charles W Helzer
His Attorney.

May 8, 1962 E. S. SAMPSON 3,033,991
NON-CONTACTING CROP SHEAR DETECTOR
Filed Dec. 29, 1959 8 Sheets-Sheet 2

Inventor:
Ernest S. Sampson,
by Charles W. Helzer
His Attorney.

May 8, 1962 E. S. SAMPSON 3,033,991
NON-CONTACTING CROP SHEAR DETECTOR
Filed Dec. 29, 1959 8 Sheets-Sheet 4

Fig. 9.

Inventor:
Ernest S. Sampson,
by Charles W. Helzer
His Attorney.

May 8, 1962 — E. S. SAMPSON — 3,033,991
NON-CONTACTING CROP SHEAR DETECTOR
Filed Dec. 29, 1959 — 8 Sheets-Sheet 6

Fig. 11

Inventor:
Ernest S. Sampson,
by Charles W. Helzer
His Attorney.

United States Patent Office 3,033,991
Patented May 8, 1962

3,033,991
NON-CONTACTING CROP SHEAR DETECTOR
Ernest S. Sampson, Schenectady, N.Y., assignor to General Electric Company, a corporation of New York
Filed Dec. 29, 1959, Ser. No. 862,548
12 Claims. (Cl. 250—219)

The present invention relates to a non-contacting crop shear detector.

More particularly the invention relates to an electro-optical gage for viewing slabs of material such as a partially rolled strip of steel and for developing an electric output signal representative of the width of the material being gaged at a particular point. This electric output signal may then be used in actuating a mechanism for cropping the material at this point.

In the processing of strips of material such as steel, aluminum, or other metals, plastic, etc. which are to be rolled into relatively thin wide strips it is desirable to cut off the ends of the flattened strip at some point during rolling so that a fairly uniform strip results. This operation is known as cropping the ends of the strip. In the case of rolling steel strips, it is the custom to roll steel and crop the strip while it is quite hot. Hence, it is impossible to obtain the measurements necessary to crop the hot steel strip with a contacting type gage. Accordingly it is desirable that a non-contacting type crop shear gage be provided which can control the action of a shearing mechanism or cropping machine to crop the strip while it is moving through the rolling stands. This permits increased mill capacity since the strip does not have to stop. Further there is less scrap material wasted as a result of the more accurate cropping in comparison to previous visual cropping techniques that varied greatly with the experience and aptitude of the operator, and greater protection is afforded the finishing stands since the occurrence of cobbles is reduced. Additionally, it is desirable that the non-contacting crop shear detector be relatively insensitive to changes in strip temperature, side-wise motion, changes in velocity of the strip, or skew of the strip.

It is therefore a primary object of the present invention to provide a new and improved non-contacting electro-optical crop shear gage for viewing and cropping the ends of strip material at desired points as the same moves along the production line without requiring that the strip be stopped.

Another object of the invention is to provide a crop shear gage of the above type which is adapted for measuring high temperature strips of material, and is accurate in operation, relatively insensitive to changes in strip temperature, velocity of strip movement, sideways motion or skew of the strip.

In practice the invention, a crop shear detector, is provided which comprises an electro-optical scanning head assembly for viewing a strip of material being gaged and developing a plurality of electric signals representative of the width of the material being gaged at different points along its length. These electric signals are supplied to comparison circuit means which are operatively coupled to the output of the electro-optical scanning head assembly comparing electric signals representing the widths of the material at at least two different points along its length, and for deriving an output electric signal representative of the difference. It is preferred that at least one signal be derived that is representative of the width of the leading edge of the strip, and a second signal be derived representative of the width of the trailing edge of this strip of material. To utilize these signals, a gating circuit is operatively coupled to the output of the comparison circuit and has a number of plurality of electric signals connected thereto as enabling potentials for gating open the output gating circuit in response to the width of the strip being gaged attaining some predetermined relative value at certain points. Additionally, it is preferred that an alarm circuit be operatively coupled to the output of the comparison circuit, and to the electro-optical means and be inhibited by the comparison circuit whereby failure of the comparison circuit to develop an output cropping signal will cause the alarm circuit to be actuated.

Other objects, features and many of the attendant advantages of this invention will be appreciated more readily as the same becomes better understood by reference to the following detailed description when considered in connection with the accompanying drawings, wherein like parts in each of the several figures are identified by the same reference character, and wherein.

Figure 1:
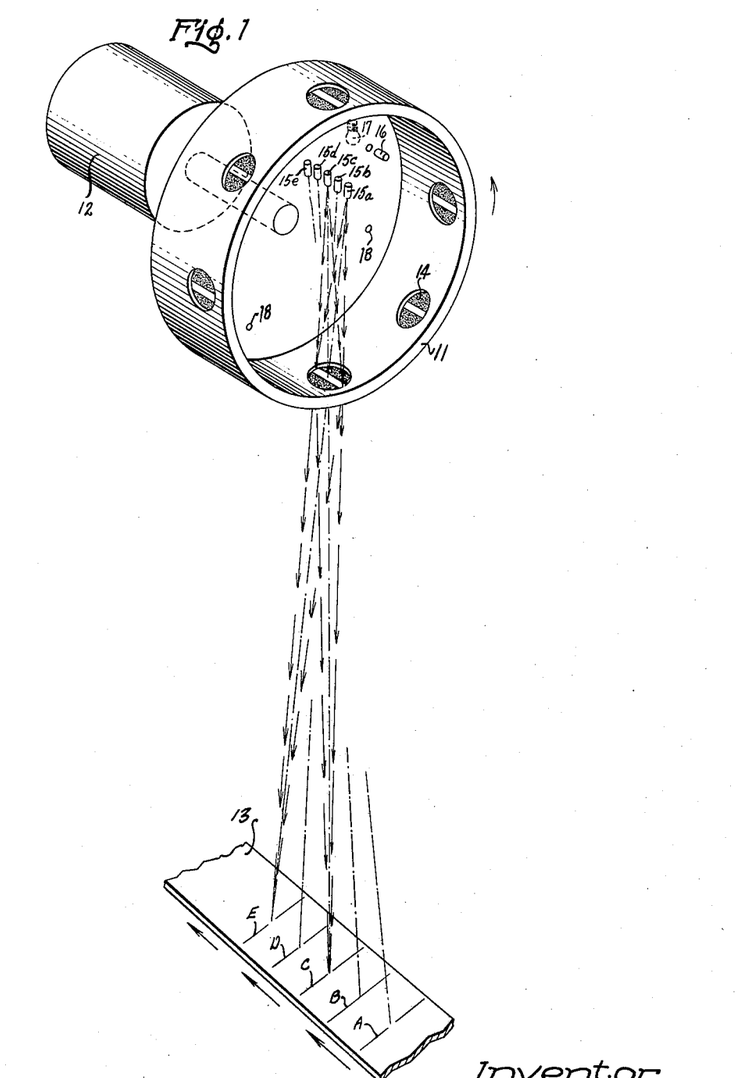
FIGURE 1 is a perspective view of a mechanical scanning head assembly comprising a part of the non-contacting crop shear detector, and illustrates the manner in which the scanning head views a moving strip of material being gaged.

The scanning head assembly shown in FIGURE 1 includes a rotatable scanning drum 11 which may be rotated counterclockwise in the direction of the arrows shown by a drive motor 12 that is shafted to the drum. The drum 11 is disposed so that its rotational axis extends along the longitudinal axis of a strip of material 13 to be gaged. The drum has a plurality of lens 14 formed around its periphery. As a consequence of this arrangement, as the drum 11 is rotated by motor 12, the lens 14 in the periphery of the drum will sequentially view sections of the strip of material 13 as it passes along the production line. Disposed within the rotatable drum 14 are a plurality of photoelectric devices 15 which are positioned to view the moving strip of material 13 through the lens 14 as the lens are sequentially rotated periodically to expose the photoelectric devices 15 to view the strip of material 13. Each of the respective photoelectric devices 15 are labeled 15a, 15b, 15c, 15d, and 15e and are located within the drum 14 in a manner such that each views along a corresponding line A, B, C, D, and E extending across the width of material 13 being gaged. Accordingly, if the strip of material 13 moves in the direction of the arrows as indicated, the photoelectric device A will be the first photoelectric device to view the leading edge of the strip of material, B will be next and so on down the line until E will be the last photoelectric device energized by the leading edge of the strip of material. Conversely, with respect to the trailing edge of material, the photoelectric device 15a will be the first one unable to view the strip of material being gaged, 15b will be the next, 15c and so on down until 15e is the last photoelectric device to view the trailing edge of the material. It can be appreciated that as the lens 14 are rotated past the photoelectric devices 15 all of the photoelectric devices will be simultaneously exposed to view the strip of material 13 through the window 14; however, depending upon the position of the strip 13 all, some or none of the photoelectric devices will be energized by reason of their ability to view the material disposed at the particular position indicated by their lines of scan A, B, C, D, or E. The particular arrangement shown in FIGURE 1 is adapted to view red hot steel strips as they pass through a rolling mill, and which emit infrared light that energizes the photoelectric devices. As a consequence the photoelectric devices 15 must be sensitive to infrared light. It is of course possible to use visible or ultra-violet light sensitive to photoelectric devices 15 together with an appropriate light source positioned under the strip of material 13 being gaged. In operation, the scanning drum 11 is continuously rotated at approximately 1800 revolutions per minute, and there are a total of eight of the lens 14 placed around the periphery of the scanning drum so that the output signal developed in the output of the photoelectric devices 15 when these devices view hot steel along one of the paths A, B, C, D, or E will be a square wave form signal having a repetition rate of about 14,400 pulses per minute.

In order to condition the circuitry that will use the width measuring intelligence signals derived by the photoelectric devices 15, a gating pulse signal generator is provided by a sixth photoelectric device 16 also located within the mechanical scanning drum 11. The gating photoelectric device 16 is adapted to view a light source 17 which is positioned on the opposite side of the closed end of the scanning drum 11 through a series of eight apertures 18 which are spaced around the circumferences of the drum. The apertures 18 are positioned relative to the photoelectric devices 15 and light source 17 in a manner such that the photoelectric device 16 will be activated just prior to one of the lens 14 exposing the photoelectric devices 15 to view the strip of material 13 being gaged. The gating signal pulses developed by the photoelectric device 16 are then used for various gating and readout purposes in the circuitry located in the electronic chassis portion of the equipment as will be described in connection with FIGURE 8 and subsequent drawings. It should be understood however that the photoelectric devices 15 and 16 are mechanically supported within the scanning heading assembly 11 along with appropriate preamplifying devices for developing a strong electric signal that contains the desired intelligence and gating control signal pulses. This signal is then supplied to the electronic circuitry which may be housed in a separate chassis located elsewhere away from the high temperature steel strip. It is anticipated that in operation, the gate will be able to sense a width deviation from 1 to 2 inches by proper adjustment of the gage with an accuracy of from ±¼ inch. The gage will be used to identify the leading and trailing end shear points of hot steel strips as they pass through a strip rolling mill and can be used to gage steel strip ranging in temperature from 1550° F. to 1950° F.

The steel strips to be gaged may vary in speed from 80 feet per minute to 240 feet per minute, have a sidewise motion of ±4 inches or vary in thickness. The gage may be easily calibrated to be used with strips ranging from 20 inches to 80 inches in width, and having a thickness of from ½ to %0 of an inch. The scanning assembly may be housed in a chassis approximately 2 feet x 2 feet x 3 feet and should be located approximately 15 feet from the strip being gaged. Since the scanning assembly is to be located in proximity to hot steel strips, it is anticipated that a cooling system will be provided for maintaining proper ambient operating conditions for all of the components of the assembly.

Figure 2:
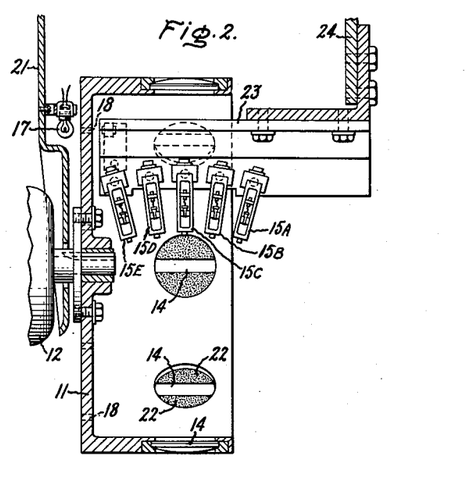
FIGURE 2 is a side view of the mechanical scanning head assembly shown in FIGURE 1.
Figure 3:
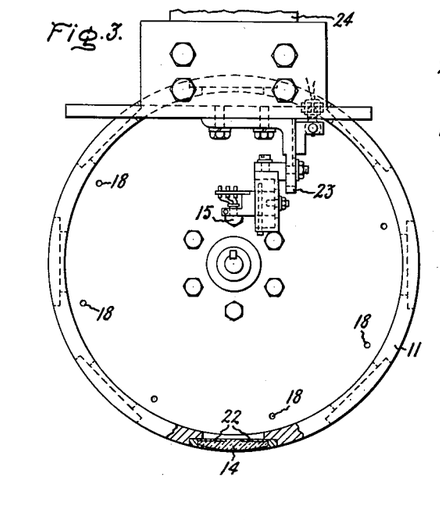
FIGURE 3 is a cross sectional view of the rotatable scanning head assembly shown in FIGURE 2.
Figure 4:
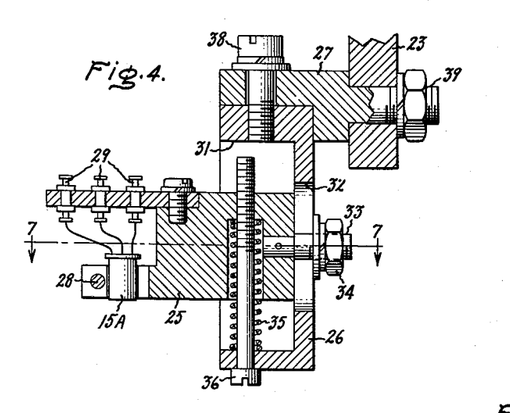
FIGURE 4 is a cross sectional view of a mounting structure used to support in viewing position the photoelectric devices incorporated in the mechanical scanning head assembly of FIGURE 2.
Figure 5:
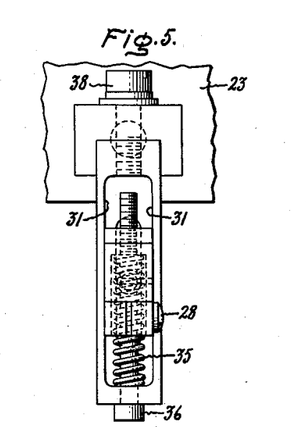
FIGURE 5 is an end view of the mounting structure shown in FIGURE 4.
Figure 6:
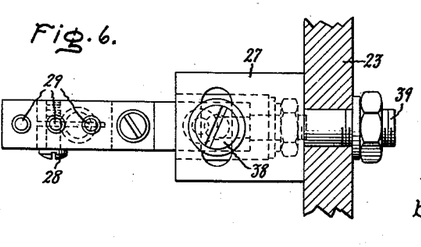
FIGURE 6 is a plan view of the mounting structure shown in FIGURE 4.
Figure 7:
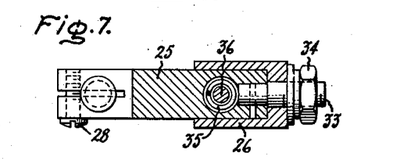
FIGURE 7 is a cross sectional view of the mounting structure shown in FIGURE 4 taken through plane 7—7 thereof.

The construction of the mechanical scanning head assembly 11 is shown in FIGURES 2 and 3 of the drawings together with the supporting arrangement for the photoelectric devices 15A thru 15E. Referring to FIGURE 2, the rotatable scanning drum 11 is bolted to a flange on the shaft of the motor 12 which may be supported in suitable brackets indicated at 21 within a housing or other chassis construction. The lens 14 formed in a periphery of the rotatable scanning head 11 actually comprises ground glass lens for focusing light emanating from the strip of material being gaged upon the photoelectric devices 15A thru 15E, respectively. For this purpose, a portion of the lens assembly indicated at 22 is masked out to enhance the sharpness of the signals being produced by the photoelectric devices. The lens 14 are mechanically supported in place over openings in the scanning drum 11 by means of suitable collars secured in the sides of the scanning drum 11. The photoelectric devices 15A thru 15E are supported on an arm 23 which extends inwardly into and thru the open face of the rotatable scanning drum 11, and is in turn supported from an L-shaped bracket secured to an extension 24 of a housing or chassis in which the scanning head assembly is mounted. The photoelectric devices 15A which in fact constitute photo-transistors are positioned in an arcuate arrangement as illustrated in FIGURE 2 so that each one sees only a respective line of view A, B, C, D, or E illustrated in FIGURE 1 of the drawings. The supporting structure used in supporting each of the photo-transistors 15A thru 15E is illustrated in FIGURES 4 thru 7 of the drawings. As best shown in FIGURE 4, the photo-transistor 15A (for example) is secured in a carriage 24 which is slideably mounted within a supporting frame 26 that in turn is secured to a rotatable supporting post 27. The photo-transistor is supported within the slideable carriage 25 within an elongated slot adapted to precisely fit the photo-transistor 15A and is firmly retained therein by means of a set screw 28 best seen in FIGURE 7 of the drawings. The leads from the photo-transistor 15A are brought out and secured to terminal post 29 which are fixed to a supporting arm that is secured to the carriage 25. The carriage 25 is slideably supported in a hollowed out track 31 best seen in FIGURE 5 of the drawings formed within the supporting member 26. The hollowed out track 31 has a slot 32 formed in its under portion against which the back edge of the slideable carriage 25 abuts, and which is adapted to receive a threaded stud 33 secured in the slideable carriage 25. A nut 34 secured on the stud 33 fixes the slideable carriage 25 in a desired set position against the action of the coiled spring 35. The coiled spring 35 is seated in a hallowed portion of the slideable carriage 25, and surrounds an adjusting screw 36 that is threadably secured in the slideable carriage 25. By this arrangement the vertical position of the slideable carriage 25, and hence the photo-transistor 15A can be adjusted by loosening the nut 34 and turning the adjusting screw 36 to raise or lower the slideable carriage against the action of the compression spring 35. Upon reaching a desired position the slideable carriage 25 may then be locked in place vertically by securing the nut 34 against the back side of the mounting support 26.

The supporting frame 26 is secured in a shoulder formed in the supporting post 27 by means of a nut 38. The supporting post 27 is in turn pivotally mounted on the arm 23 that extends into the interior of the rotatable scanning drum 11 by means of a threaded stud and nut 39. By reason of this construction, the nut 39 can be loosened and the supporting post 27 rotated to place the holder for the photo-transistor 15A in any desired angular position such as illustrated in FIGURE 2 of the drawings. As a consequence of the above described arrangement, it can be appreciated that the holders for the photo-transistors 15A thru 15E are secured on the supporting arm 23 within the interior of the rotating scanning head 11 in a manner such that they can be angularly and vertically displaced so as to bring their line of view into coincidence with the selected one of the lines A, B, C, D, or E as shown in FIGURE 1 of the drawings. Accordingly, as each of the lens 14 in the scanning drum 11 rotates over the strip 13 being gaged, the photo-transistors will develop a pulse output electric signal whose pulse time duration will be related to the width of the material 13 which is viewed along a respective line A, B, C, D, or E.

Figures 8, 8A:
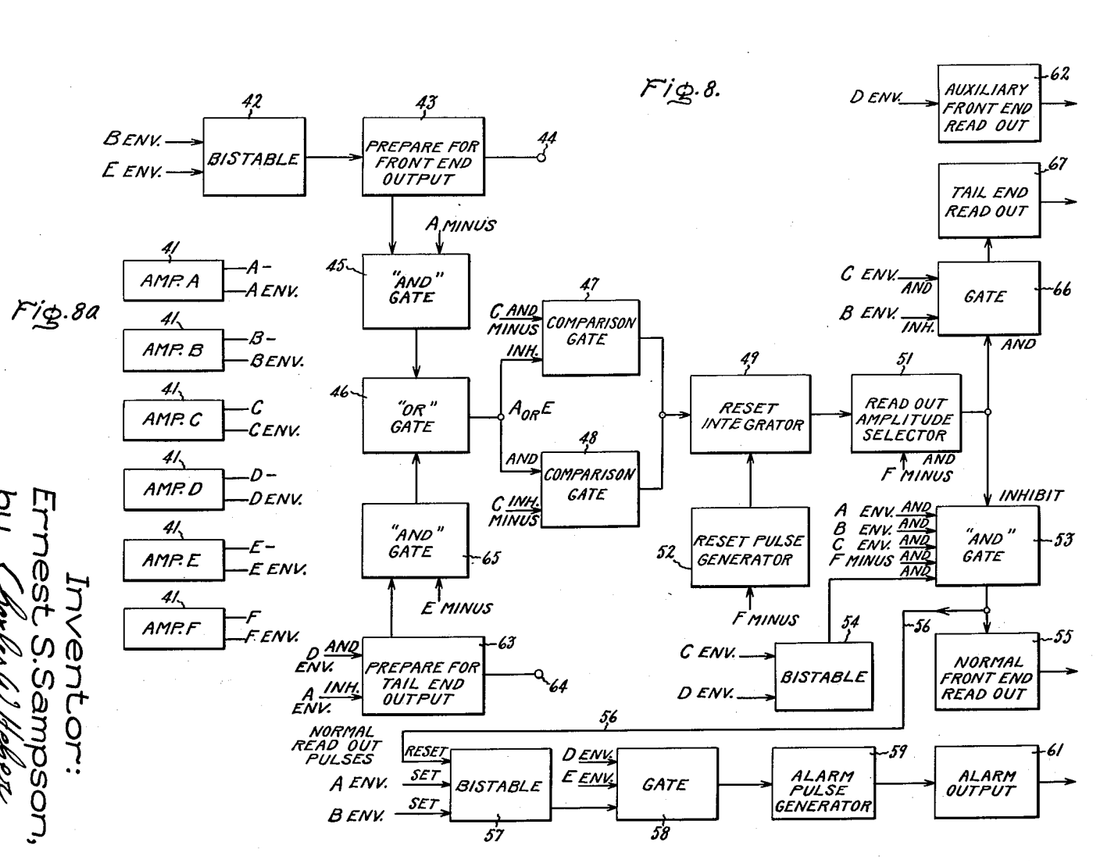
FIGURE 8 is a functional block diagram of the electronic circuitry used with the non-contacting crop shear detector constructed in accordance with the invention.
FIGURE 8a is a detail of the block circuit diagram.

The functional block diagram of the electronics circuitry which utilizes the width indicating electric signals developed by the photo-transistors 15A thru 15E, as well as the gating signal developed by the photo-transistor 16 in the scanning head assembly, is illustrated in FIGURE 8 of the drawings. The functional block diagram of FIGURE 8 depicts a number of amplifiers 41 for amplifying each of the A, B, C, D, E, and F signals and producing at the output terminals thereof two different types of signals. As will be explained more fully hereinafter, one of the types of signals at the output terminal of the amplifier 41 is designated A minus (A—), B minus (B—), etc., and comprises a pulsed waveform signal the duration of the pulses being related to the width of the strip of material as viewed by the photo-transistor along any one of the lines A thru E. The F— pulse, of course, represents the gating pulse produced by the gating photo-transistor as the rotation of the scanning drum 11 moves one of the openings 18 past the photo-transistor 16. The envelope signals produced at the output of each of the amplifiers 41 is an integrated output signal obtained by integrating the series of pulses produced as each of the windows 14 in the mechanical scanning head assembly serially exposes the photo-transistors 15A thru 15E to view the moving strip of material 13 being gaged. This envelope signal of course has a time duration coextensive with the length of time that the scanning head assembly is able to observe the material 13 being gaged. Accordingly, the presence or absence of an A envelope, B envelope, C envelope and so forth signals can be used to determine whether or not the strip being gaged can be viewed along any one of the particular gauging lines A, B, C, D, or E.

GENERAL DESCRIPTION OF CIRCUITRY

The electronic circuitry shown in FIGURE 8 operates to develop a prepare for front end cut signal by employing the A thru E signals developed by the amplifiers 41. This circuitry includes a bistable amplifier 42 having the B envelope signal developed by the B amplifier 41 supplied to its Set input terminal, and the E envelope signal developed by the E amplifier 41 supplied to its Reset input terminal. The output of bistable multivibrator 42 is connected to a coupling circuit 43. The coupling circuit 43 develops an output signal that is applied through an output terminal 44 to auxiliary equipment used with the crop shear detector herein described as a prepare for front end readout warning signal, and supplies a second output to an AND gate 45. The AND gate 45 also has supplied thereto the A— signal developed by the A amplifier 41, and has its output connected through an OR gate 46 to one input of each of two comparison gate circuits 47 and 48. The comparison gate circuits 47 and 48 also have the C— signal supplied thereto directly from the output of the C amplifier 41, and function to develop an output signal that is representative of the width differential of the strip occurring between points represented by the lines of view A and C, as will be explained more fully hereinafter. The pulsed composite signal appearing at the output of the comparison gate 47 periodically as each individual window 14 in the scanning drum 11 exposes the photo-transistors 15 to view the strip 13 is then applied to an integrator circuit 49 having its input connected to both the comparison gates 47 and 48. The integrator circuit 49 has its output connected to a readout amplitude selector circuit 51, and has a reset pulse generator 52 connected thereto which is actuated by F— gating pulses applied from the F— amplifier 41. The reset pulse generator 52 serves to reset integrator 49 after each window 14 in the scanning drum 11 scans across the width of the strip of material 13 being gaged. Simultaneously, the readout amplitude selector 51 which is actuated by an F— signal applied from the output of the F amplifier 41, samples the potential on the integrator 49, and upon this potential reaching a predetermined value will read it out. The output signal supplied from the readout amplitude selector 51 is applied to an AND gate 53 which has supplied thereto a number of enabling potentials. In particular, the A envelope, B envelope, C envelope and F— signals are applied to the AND gate 12 as enabling potentials along with a 5th potential supplied from a bistable multivibrator 54 which is Set by the C envelope signal and Reset by the D envelope signal. When all of these enabling potentials are available at AND gate 53, the AND gate opens, and supplies a front end cut signal from its output to a normal front end readout amplifier circuit 55. The output signal derived from the AND gate 53 is also applied over a conductor 56 to the Reset input terminal of a bistable multivibrator 57. The bistable multivibrator 57 also has the A envelope and the B envelope signals applied thereto as enabling potentials, and has its output supplied as an enabling potential to an AND gate 58. AND gate 58 also has the D envelope signals and E envelope supplied to its Set or On input terminal, and has its output connected to an alarm pulse generator 59 which in turn is connected to a suitable alarm amplifier output circuit 61. In addition to the alarm circuits, an auxiliary front end readout generator 62 is provided which is energized by the D envelope signal to develop an auxiliary front end cut output signal in the event that no normal front end cut signal is developed by the readout amplifier 55.

After the strip of material 13 has passed through the gaging equipment, a prepare for trailing end readout signal is developed by a gate circuit 63 having the D envelope signal supplied to its On terminal, and having the A envelope signal applied as an inhibiting potential. Output signals from the gate circuit 63 are applied through an output terminal 64 to auxiliary equipment such as a cropping machine used with the detector to condition this machine for operation. Gate 63 also supplies an enabling potential to an AND gate 65 to which the E— signals are also applied, and the output of the AND gate 65 supplied through OR gate 46 to both comparison gates 47 and 48. During the trailing end operation the E— signal and the C— signal will charge the integrator 49 which is read out by the readout amplitude selector and the output potential supplied through output gate 66. Gate 66 has the C envelope signal applied thereto as an enabling potential, and the B envelope signal is applied as an inhibiting potential. Upon removal of the B envelope signal due to passage of the strip of material 13 out of view of the photo-transistor 15b, the gate 66 will be enabled, and the trailing end readout cut signal will be supplied through a trailing end readout cut signal gating circuit 67 and supplied to the cropping machine used with the equipment. It should be noted that at no time should both the A— potentials and E— potentials be applied to the comparison gates 47 and 48 concurrently. This is true because the E envelope signal turns off bistable 42 that enables AND gate 45. Consequently, upon the occurrence of the E— and hence E envelope signals, the AND gate 45 is disenabled and the A— signals can no longer be supplied therethrough.

In operation, as the strip of material 13 moves in the direction of the arrows shown in FIGURE 1 it will first be detected by the photo-transistor viewing line A, and accordingly an A— signal will appear at the input of AND gate 45. The A— signal cannot get through the AND gate 45, however since the AND gate 45 has not been enabled by a potential from the coupling circuit 43. It is not until the strip of material being gaged has moved down so that it can be viewed by the photo-transistor 15b viewing line B that a B enevelope potential will be produced at the output of the B amplifier 41. The B envelope potential will then turn on bistable 42 which will provide an enabling potential through the coupling circuit 43 to the AND gate 45. Upon this occurrence, AND gate 45 will allow the A— signal pulses to pass therethrough and through the OR gate 46 to both of the comparison gates 47 and 48 in the comparison circuit. Thereafter, the leading edge of the strip of material 13 moves down to a position so that the strip can be viewed by the photo-transistor 15c observing line C whereupon C— signal pulses will be applied to the comparison gates 47 and 48. It can be appreciated that since photo-transistor 15c is viewing the leading edge, the signal at C— will have less time duration than the signal being produced at A— since the narrow or pointed portion of the leading edge is now located at a point where it is viewed by photo-transistor 15c. Accordingly there will be a differential between the C— and the A— signals representative of the width of the strip at these two points. The gate 47 actually sums the two signals, the A— signal and the C— signal, and applies the composite signal to the integrator circuit 49. The integrator circuit 49 is continuously sampled by a readout amplitude selector 51 which is actuated by the F— gating signal, and which serves to apply the potential built upon the integrator 49 to the AND gate 53 as an inhibiting potential. Previously, the AND gate 53 has had the A, B and C envelope signal supplied thereto as enabling potentials along with potentials supplied from the bistable 54 due to the fact that the C envelope signal has already turned this bistable on. Upon the differential between the A— and C— signals reaching a predetermined value it will charge the integrator 49 to an amplitude such that the readout amplitude selector 51 is blocked. It should be noted that after each successive sweep of a lens 14 in the scanning head assembly when an A— and C— signal pulse are produced, the integrator 49 is reset by the reset pulse generator to zero or reference potential. Accordingly as each successive window 14 sweeps past the photo-transistor 15 to develop a new A— and C— pulse, the integrator 49 will be charged to a value determined by the instantaneous summed value of the A— and C— signal pulses. Hence the effect of the A— and C— pulses are not cumulative on the integrator, and the predetermined differential value which blocks the readout amplitude selector 51 represents the point on the strip of material 13 being gaged where it is desired that the cropping machine crop the end of the strip. Accordingly, upon reaching this value the readout amplitude selector 51 is blocked so that the inhibiting potential normally applied to the AND gate 53 concurrently with every F— pulse is at this point not applied to the AND gate 53. The F— pulse applied to the AND gate 53 is then allowed through the gate 53 and actuates the normal front end readout output amplifier 55. Simultaneously, this front end cut readout pulse is applied over the conductor 56 to turn off the bistable 57 which has previously been turned on by the A envelope and B envelope signals.

In the event that no front end readout signal is developed within a predetermined time interval at the output of the AND gate 53, and supplied over the conductor 56 to turn off bistable 57, then the enabling potentials supplied from the bistable 57 to AND gate 58 will allow this gate to be opened upon the appearance of a D envelope signal at the output of the D envelope amplifier 41. Opening of the AND gate 58 will then supply an enabling potential to an alarm pulse generator 59 which will then generate an alarm signal pulse that is supplied through the alarm output amplifier 61 to a suitable alarm device such as an indicator light, audible alarm and the like. Concurrently, the D envelope signal activates the auxiliary front end readout cut signal generator 62 shown in the upper right hand corner of FIGURE 8 of the drawings so that a front end cut signal is supplied to the cropping mechanism associated with the equipment. This assures that in any eventuality, the front end of the strip of material 13 will be cropped to prevent possible cobbling in the rolling mills. The amount cut would be equal to the distance between the lines C and D shown in FIGURE 1 of the drawings.

During the development of the front end cut signal by the previously described portion of the circuit, the trailing end cut signal circuits are not in use for the A envelope signal is applied as an inhibiting potential to the gating circuit 63. Subsequently, the D envelope signal is applied to gate 63 as an enabling potential so that immediately after completion of the front end readout cut signal operation, both these potentials are available at the input of the gating circuit 63. After the strip 13 being gaged has completed its passage under the scanning head assembly, and the trailing edge of the strip appears, the photo-transistor 15a will be unable to see any of the strip due to the fact that the trailing edge of the strip has passed the line of view A of the photo-transistor. Consequently, at this point the A envelope inhibiting potential applied to the gating circuit 63 will be removed, and the D envelope enabling potential will be supplied to the AND gate 65. Simultaneously, a prepare for trailing end readout signal is supplied to the terminal 64 and is used to prepare the cropping mechanism or other device associated with the gage for operation. Upon the AND gate 65 being enabled the E— signal pulses being supplied thereto from the E amplifier 41 are allowed to pass through the OR gate 46 to the comparison gates 47 and 48. In addition, the C— signal pulses are supplied to the comparison gates 47 and 48 and are added together with the E— pulses in the gating circuit 47 and supplied to the integrator circuit 49. The integrator circuit 49 is periodically sampled by the readout amplitude selector 51 and is actuated by the F— pulses, and this sampling will occur just after each C— or E— pulse generation. After a short delay, the reset pulse generator which is likewise actuated by the F— pulses will reset the integrator circuit 49 to a zero or reference level so that a fresh reading is obtained from the integrator 49 as each lens 14 in the scanning head assembly sweeps past the strip 13. Upon the integrator 49 being charged to some predetermined value by the combined output of a set of C— and E— signal pulses which value represents the desired differential between the trailing edge as represented by the C— pulse width, and the reference width as representative by the time duration of the E— pulse, the readout amplitude selector 51 will be caused to open and pass a signal pulse to the gate 66 as well as to the readout AND gate 53. It should be noted, however, that readout AND gate 53 requires as one of the enabling potentials the A envelope signal which is no longer present, so that this AND gate is disabled. The readout AND gate 66 has the B envelope supplied thereto as an inhibiting potential, and the C envelope supplied thereto as an enabling potential. Hence, so long as a B envelope is present, the readout AND gate 66 will fail to open and even though the readout amplitude selector 51 is supplying readout pulses to this gate, no trailing end readout cut signal can be derived from the circuitry. However, after the trailing end of the strip of material 13 being gaged has passed beyond the viewing line B shown in FIGURE 1 the B envelope signal will no longer be present so that the AND gate 66 will be enabled. Accordingly, the next time the readout amplitude selector 61 reads out a signal pulse from the integrator circuit 49 this readout signal pulse will be supplied through the AND gate 66 to the trailing end readout amplifier 67 which will supply the trailing end cut signal to the cropping mechanism associated with the gage. It should be noted that prior to the commencement of the operation for developing the trailing end cut signal the E envelope signal has turned off bistable multivibrator 42 so that no enabling potential is supplied from that multivibrator through the gate 41 to AND gate 45. Consequently, AND gate 45 is disenabled so that the A— signal pulses cannot be supplied therethrough to the comparison gates 47 and 48. Hence during the trailing end cut signal operation only the E— and C— signal pulses will be supplied through OR gate 46 to the comparison gates 47 and 48.

DETAILED DESCRIPTION OF CIRCUITRY

Front End Cut Signal Generation

Figure 9:
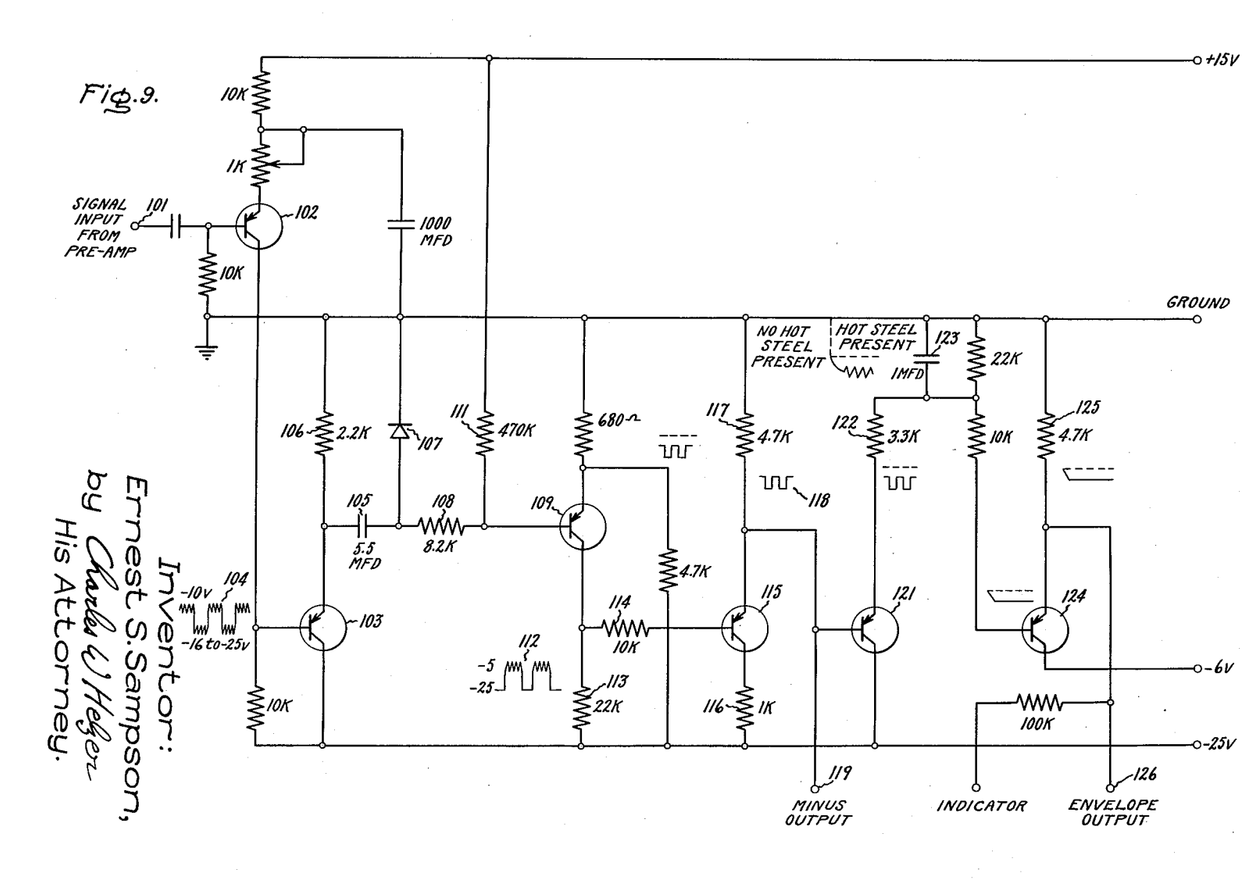
FIGURE 9 is a schematic circuit diagram of a preamplifier and amplifying circuit arrangement comprising a part of the shear detector circuitry.

The details of construction of the amplifiers 41 used to develop the A— and A envelope thru E— and E envelope signals are shown in FIGURE 9 of the drawings. It is anticipated that preamplifiers of conventional construction will be used with scanning head assembly 11 shown in FIGURE 1, and will be connected to the output of phototransistors 15 comprising a part of the mechanical scanning head assembly. These preamplifiers are of conventional construction and hence have not been shown in detail. Depending upon the brightness of the steel observed by the scanning head assembly, as well as other factors, the signal output from the photo-transistors and preamplifiers mounted in the scanning head assembly may vary from a few millivolts to as much as 3 or 4 volts. This signal is applied to the input terminal 101 shown in FIGURE 9 and thence to a conventional two stage direct coupled amplifier formed by a transistor 102 and a transistor 103 which may be of the PNP junction type. The width indicating signals at the output of the amplifier have the wave form indicated at 104 with an amplitude of from —6 to —15 volts depending upon the adjusted gain of the circuit, and depending upon the signal variations impressed thereon due to noise variations, and the brightness of the strip being gaged and other factors. The signal is essentially of square wave form however, and is amplified in the two stage RC coupled amplifier 102 and 103, and supplied to a sliding clamp circuit including a circuit which performs essentially a wave shaping function in that it removes the variations imposed on the square wave signal by noise. This sliding clamp circuit is formed by a capacitor 105 coupled from the emitter load resistor 106 of transistor 103, and a clamping diode 107 connected between the capacitor 105 and ground. The juncture of the capacitor 105 and the diode rectifier 107 is coupled through a current limiting resistor 108 to the base electrode of a PNP transistor 109. The juncture of the base electrode of the transistor 109 and the limiting resistor 108 is connected through a voltage dropping resistor 111 to a source of positive 15 volt potential. By this arrangement the current normally drawn through the diode rectifier 107 produces a predetermined biasing potential for the base electrode of the transistor 109. The undesired noise components appearing in the signal output of the transistor 103 are of insufficient magnitude to overcome this bias so that only the desired square wave signal pulses indicative of the width of the strip of material being observed are adequate to drive the base of transistor 109 sufficiently negative to allow the transistor to become conductive. In the event of an increase in amplitude of the signal being supplied from the output of the two stage amplifier formed by the transistors 102 and 103, the positive charge built up on the capacitor 105 is adequate to drive the bias on the base electrode transistor 109 sufficiently positive to make up for the increase in amplitude of the signal. Consequently, the transistor 109 will continue its function of noise elimination in that the undesired noise components will not be passed, and a signal having a wave form such as shown on 112 will appear across the collector resistor 113. To operate the transistor 109 in this fashion an emitter bias potential is supplied thereto from a voltage divider resistive network connected between ground and a source of —25 volts. The amplified and partially shaped square wave signal potential appearing across the emitter load resistor 113 is then supplied through a limiting resistor 114 to the base electrode of an NPN transistor 115. The NPN transistor 115 has its emitter electrode connected to the source of —25 volts through an emitter load resistor 116, and has its collector electrode connected to ground through a collector load resistor 117. The NPN transistor 115 by reason of the bias supply thereto operates (in a cut-off) condition so that it is driven into saturation by the signal supplied thereto from the transistor 109. As a consequence transistor 115 will serve to clip the top portions of the square wave signal supplied thereto so that essentially a clean square wave potential appears across its collector load resistor 117 having the wave form shown at 118. This is the desired minus signal to be supplied to the remainder of the crop shear detector circuitry as illustrated in the functional block diagram of FIGURE 8, and accordingly is supplied through the output terminal 119 to whatever portions of the crop shearing circuitry as required in accordance with the design of the circuitry.

The square wave minus signal appearing at the output terminal 119 is also applied to the base electrode of a transistor 121 which is of the PNP type. Transistor 121 has its collector electrode connected directly to the source of —25 volts and its emitter electrode connected through a load resistor 122 to a charging capacitor 123. The junction of the charging capacitor 123 and resistor 122 is connected to the junction of a pair of biasing resistors connected in series between the base electrode of a transistor 124 and ground. The collector electrode of transistor 124 is connected directly to a source of —6 volts and its emitter electrode is connected through a load resistor 125 to ground. The essentially square wave minus signal appearing at the output terminal 119 is then supplied through the gating transistor 121 to the charging capacitor 123 where it is integrated to build up the bias supplied to the base electrode of the transistor 124. Transistor 124 is normally cut off until such time that the signal input to the capacitor 123 charges the capacitor. Upon capacitor 123 reaching —6 volts, the output of transistor 124 is limited to this value. The time constant of the charging circuit formed by the capacitor 123 and one of the biasing resistors connected in the base electrode circuit of the transistor 124 is adjusted so that the potential of the charging capacitor 123, and hence the bias supplied to the base electrode 124, is maintained at a level of approximately —6 volts. This causes the transistor 124 to be rendered conductive, and upon becoming conductive, clamps the output terminal 126 from which the envelope signal is obtained to —6 volts potential. Consequently, for as long as the square wave minus signal pulse is supplied through the gating transistor 121 to charging capacitor 123, the transistor 124 will be maintained conductive, and an envelope output potential will be supplied to the output terminal 126. As long as the scanning head assembly 11 of FIGURE 1 can see the strip 13 being gaged along the line which the particular photo-transistor 15 and associated amplifier 41 in question view, the envelope signal will be present at the output terminal 126. However, when the strip is moved past this point so that the square wave minus signals are no longer applied to the gating transistor 121 and charging capacitor 123, the transistor 124 will become non-conductive, and the output terminal 126 will be returned to ground level.

Figure 10:
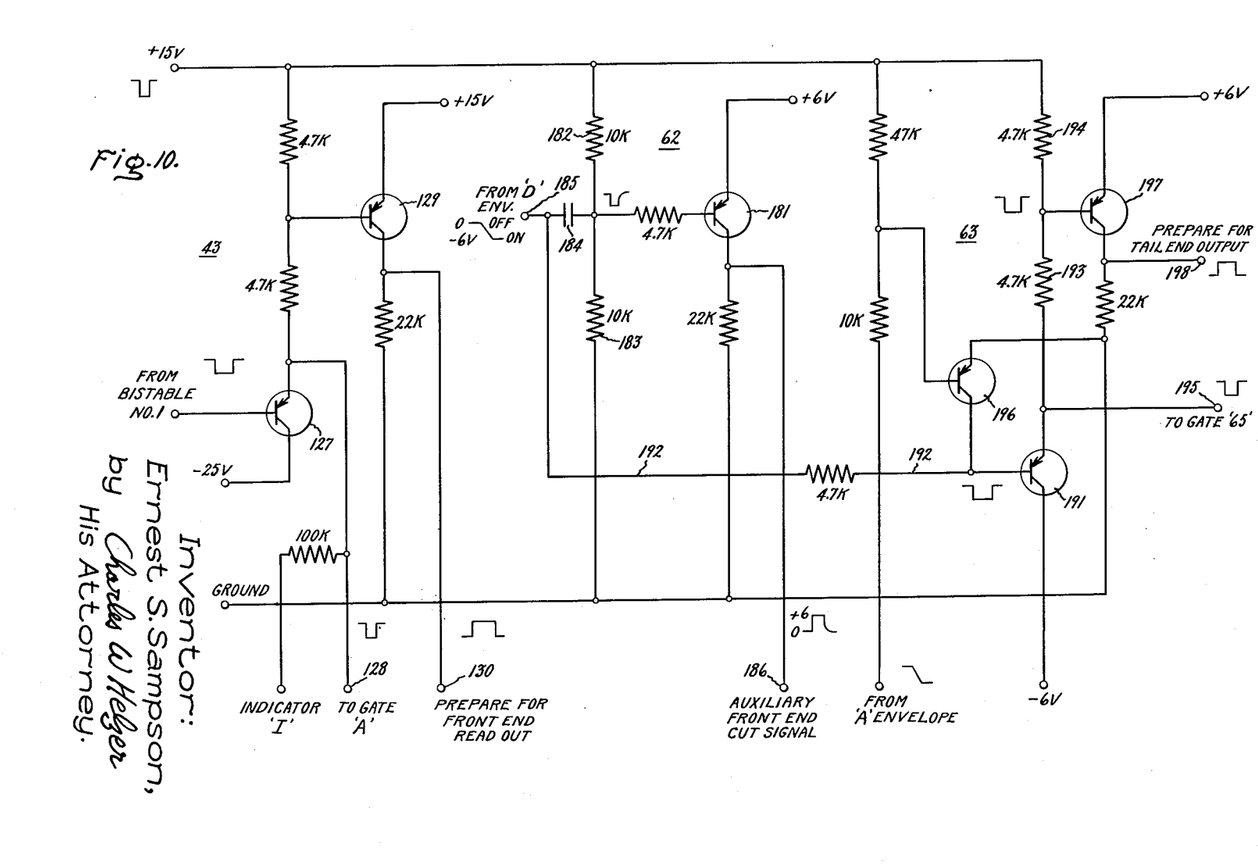
FIGURE 10 is a schematic circuit diagram of a pair of gating circuits comprising a part of the circuitry shown in the functional block diagram of FIGURE 8.

The minus envelope signals appearing at the output terminals 126 of the amplifiers 41 illustrated in FIGURE 9 of the drawings, are applied to desired points of the crop shear detector circuitry illustrated in block diagram form in FIGURE 8. In FIGURE 8, the first circuit component in the portion of the circuitry which develops the front end cut signal comprises a bistable multivibrator. Because this circuit element can be of standard construction, and suitable circuits for this purpose have been described in many reference texts, its details of construction have not been illustrated and described. For a complete description of a satisfactory bistable multivibrator for use as this element in the circuitry, reference is made to the reference text entitled "Pulse and Digital Circuits," by Millman and Taub, authors, published by the McGraw-Hill Book Company, Inc., 1956, and in particular to Chapter 5 of this textbook. For a transistorized version of a bistable multivibrator reference is made to page 595 of the above identified reference text by Millman and Taub. The output signal from the bistable multivibrator 42 in the functional block diagram of FIGURE 8 will comprise essentially a continuous square wave potential that is applied to the input terminal of the gating circuit 43. The details of construction of the gating circuit 43 are shown in FIGURE 10 of the drawings and include a PNP junction transistor 127. The transistor 127 has its collector electrode directly connected to a source of −25 volts, and has its emitter electrode connected through a pair of series biasing resistors to a source of positive 15 volts. Enabling potentials are supplied to the next succeeding element in the functional block diagram of FIGURE 8 through the gated transistor 127 when it is gated on through an output terminal 128 connected to the emitter electrode of transistor 124. If desired, a suitable indicator may be connected at this point for signal tracing purposes. In addition to the enabling potential supplied through the output terminal 128, the gating circuit also provides a prepare for front end readout signal of positive polarity for use by the cropping mechanism associated with the crop shear detector. For this purpose, a second transistor 129 is provided which has its base connected to the juncture of the bias resistors in the emitter circuit of transistor 127. The emitter electrode of transistor 129 is connected directly to a source of positive 15 volts, and the collector electrode of the transistor is connected through a suitable load resistor to ground. The desired positive going prepare for front end readout signal pulses are derived from across the collector load resistor, and supplied through the output terminal 130 to the cropping mechanism associated with the crop shear detector.

Figure 11:
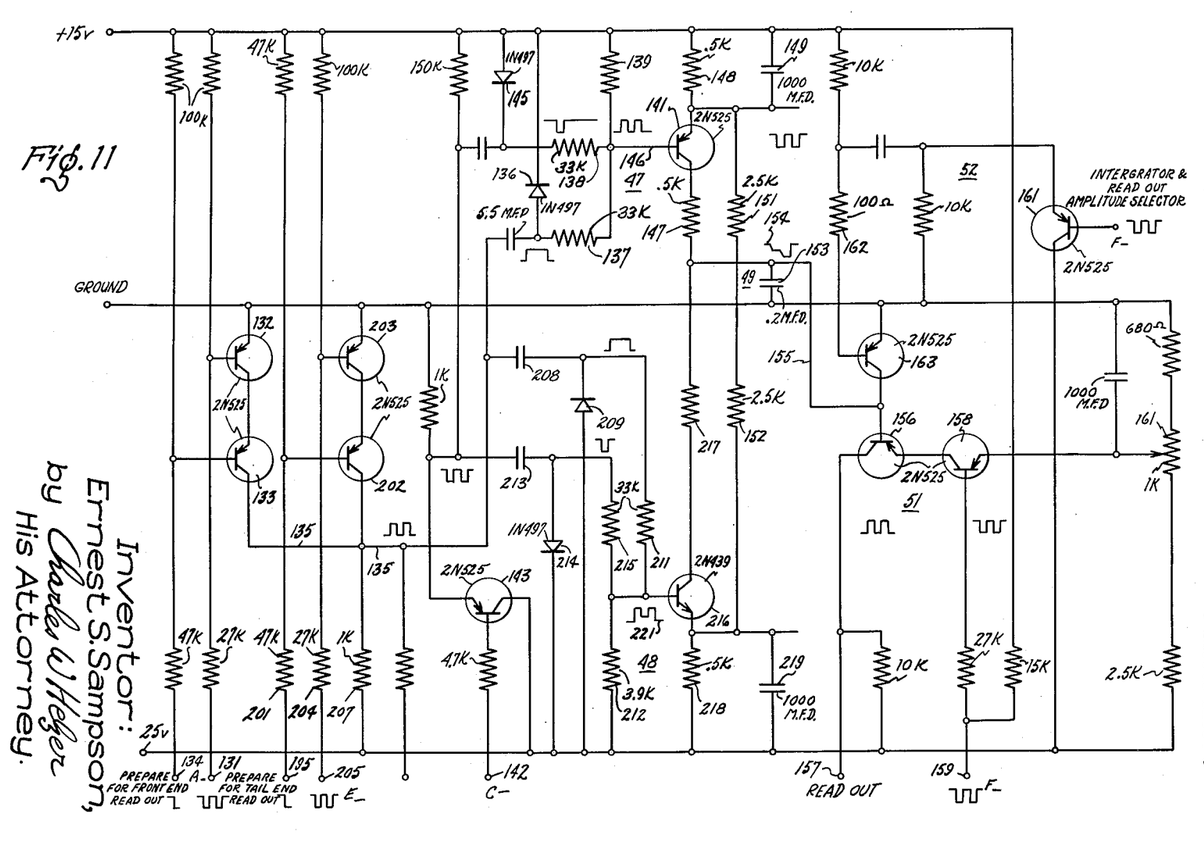
FIGURE 11 is a schematic circuit diagram of a comparison circuitry arrangement used in the functional block diagram of FIGURE 8.

The details of construction of the AND gate 45, OR gate 46, and the comparison gates 47 and 48, the integrator 49, and the readout amplitude selector 51 are shown in FIGURE 11 of the drawings. The A— signal supplied from the input gate 43 is applied to an input terminal 131, and is applied to the base electrode of the PNP junction transistor 132. The transistor 132 has its base electrode connected to the junction of a pair of biasing resistors that are connected in series circuit relationship between terminal 131 and a source of positive 15 volts. The emitter electrode of the transistor 132 is connected directly to ground, and the collector electrode thereof is connected directly to the emitter electrode of a second PNP junction transistor 133. The transistor 133 operates as an AND gate for the A— signal supplied through transistor 132 so that when transistor 132 is non-conducting, the A— signals are not allowed to pass. The transistor 133 has its base electrode connected through a biasing resistor to the source of positive 15 volts, and through a limiting resistor to an input terminal 134 to which the prepare for front end readout enabling potential is applied. As a result of this connection, upon a prepare for front end readout enabling potential being applied to the transistor 133, the A— signal pulses supplied to transistor 132 gate open this transistor so that inverted A— signal pulses are applied over a connector 135 across a clamping diode 136 to a resistive summing network 47. The resistive summing network is formed by a pair of summing resistors 137 and 138, and a load resistor 139 which is connected to the base electrode of a gating transistor 141. The A— signal pulses applied across resistor 137 are summed together in the load resistor 139 together with the C— signal pulses. The C— signal pulses are supplied through the input terminal 142 to the base electrode of a buffer transistor 143. The collector electrode of transistor 143 is connected directly to the source of −25 volts, and emitter electrode is connected through a load resistor to ground. The C— signal pulses supplied through buffer transistor 143 are applied across a second clamping diode 145 and summing resistor 138 to load resistor 139 where the C— signal pulses are summed together with the A— signal pulses. It should be noted that the C— signal pulses applied across the summing resistor 138 are negative going in polarity while the A— signal pulses applied across the summing resistor 137 are positive going in polarity, and that the time duration or the width of the A— and C— signal pulses represent the width of the strip of material 13 being gaged along the lines A and C, respectively, shown in FIGURE 1. Also the pulse duration or width of the A— signal pulses is greater than that of the C— signal pulses due to the fact that the leading edge is tapered. Upon being summed, a composite output signal is developed across the summing network load resistor 139, which has the wave shape indicated at 146. This composite signal is applied to the base electrode of transistor 141 which has its collector electrode coupled to ground through a load resistor 147 and an integrating capacitor 153. The emitter electrode of transistor 141 is connected to a biasing network formed by a resistor 148 and capacitor 149 connected between the emitter and a source of positive 15 volts. The emitter biasing circuitry further includes a pair of series connected resistors 151 and 152 which are connected between resistor 148 and a source of −25 volts. The bias on the transistor 141 is adjusted so that the positive going signal pulses indicated at 146 which will be produced across the load resistor 139 when a centered condition exists (i.e. the strip of material 13 is not skewed) will not gate open the transistor; however, a negative going signal pulse which will be produced if the strip 13 is skewed which will render the transistor 141 conductive, and results in supplying a positive charge to integrating capacitor 153 connected between ground and the collector load resistor 147. Concurrently with the above operation the A— signal pulses are also applied through a coupling capacitor 208 across a clamping diode 209 to a resistive summing network formed by a summing resistor 211, and a load resistor 212. Likewise, the C— signal pulses are coupled through a coupling capacitor 213 across clamping diode 214, and supplied through a summing resistor 215 to the load resistor 212. The C— signal supplied to summing resistor 215 and the A— signal supplied to summing resistor 211, are summed together, and a composite output signal appears across the load resistor 212 which is applied to the base electrode of a gating transistor 216. Transistor 216 is of the NPN type and differs from the gating transistor 141 in that a positive going potential applied to its base electrode turns this transistor on. The collector electrode of the transistor 216 is connected through a resistor 217 to the integrating capacitor 153, and the emitter electrode of transistor 216 is connected through a .5K biasing resistor to the source of negative 25 volts. The resistor 218 is part of a biasing network that further includes the biasing resistor 152 and capacitor 219. This biasing network provides a bias to the emitter electrode of transistor 216 of a value such that the transistor is rendered conductive only when the composite electrical signal applied to its base electrode reaches some predetermined positive value. It should be noted that the E— signals applied across the summing resistor 211 to the load resistor 212 are positive going in nature while the C— signal pulses applied across the summing resistor 215 are negative going so that the composite signal applied to the base electrode of transistor 126 will have the wave form illustrated at 221. As can be appreciated from the examination of the wave form shown in 221 the time duration of the two positive going voltage pulses is dependent upon the relative widths of the strip 13 at the lines of view A and C. It should be further noted in conjunction with FIGURE 1 of the drawings that during the front end cut signal operation the width of the strip of material 13 being viewed along the line C will become progressively greater as more of the tapered end of the strip comes into view. Hence, the pulse duration of the C— signal pulses becomes progressively larger. As a consequence, the positive signal pulses occurring in the composite signal illustrated at 221 becomes less and less.

Figure 13:
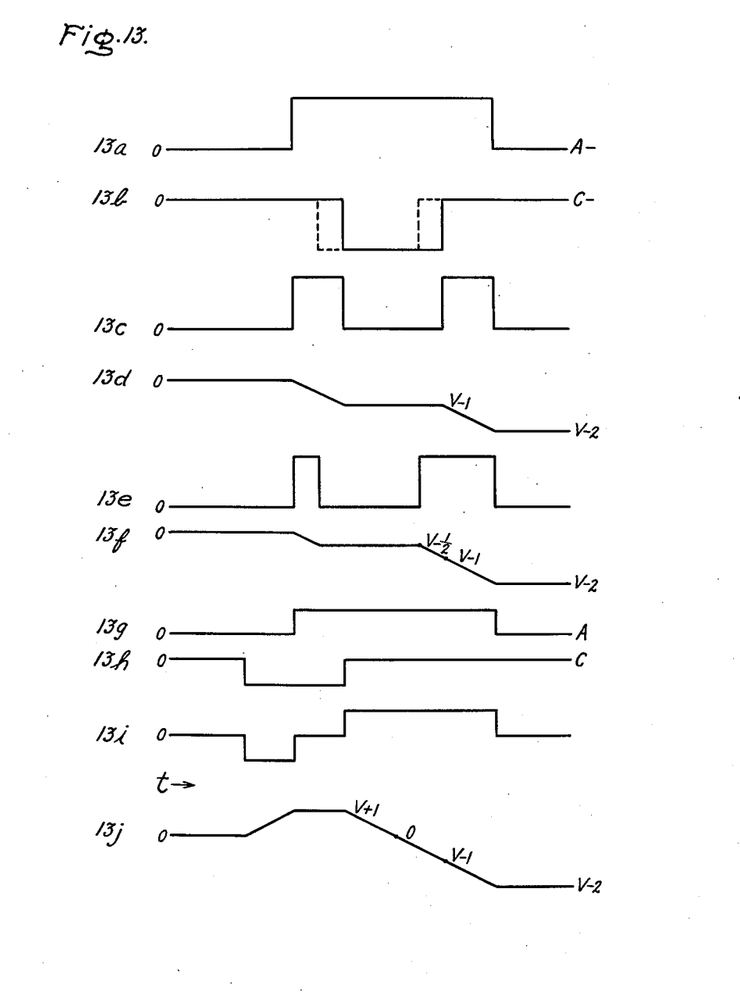
FIGURE 13 is a series of waveforms useful in understanding the operation of the circuitry of the invention.

The operation of the integrating capacitor 153 can best be understood in connection with the voltage versus time duration characteristics shown in FIGURE 13 of the drawings. Assume that the positive going signal pulses have the wave forms illustrated in FIGURES 13a and 13b and are applied to the base electrode of the two transistors 141 and 216. This condition exists when there is no skew in the strip of material 13 being gaged, and the C— signal pulse coincides substantially with the A— signal pulse. For the purpose of illustration, the A— pulse is represented as four units in duration, and a C— signal pulse is represented as two units in duration. Upon being added together in the summing networks, the composite output signal has the wave form shown at FIGURE 13c wherein two positive going signal pulses are provided at the beginning and the end of time duration period of the A— signal pulse. These positive going signal pulses are applied to the base of the transistors 141 and 216 and will have no effect on the transistor 141 but will gate open the transistor 216. The transistor 216 will invert the signal pulses, and serve to charge the integrating capacitor 153 negatively in the manner illustrated in FIGURE 13d of the drawings. Referring to FIGURE 13d it can be seen that during the first signal pulse the potential on the charging capacitor 153 will be dropped to a first potential designated as V—1, and that upon the occurrence of the second pulse the potential will be dropped to the value V—2. It is this final potential value V—2 which will be sampled by the readout amplitude selector 51 in the manner to be described more fully hereinafter, and it is the ultimate value of V—2 which determines whether a front end cut signal will be produced by the circuitry. In the event that the C— signal pulse is not exactly centered with respect to the A— signal pulse a composite output signal might be supplied to the gating transistor 216 which will have the wave form illustrated in FIGURE 13e of the drawings. Following inversion in the gating transistor 216 the charging capacitor 153 might then be charged in the manner illustrated in FIGURE 13f of the drawings. As shown in FIGURE 13f, the charge on capacitor 153 first drops to some intermediate value less than V—1, for example, V—½. As a result the first charging pulse applied from the gating transistor 216, and subsequently will be charged the remaining 1½ units to attain the desired final value V—2 by the second of the gating pulses. In the event that the skew of the strip of material 13 being gaged is so bad that the C— pulse shown in FIGURE 13h occurs in point of time ahead of the A— signal pulse as represented at 13g and 13h, then the transistor 141 will enter into the charging of the integrating capacitor 153. It should be remembered that the two A— and C— signal pulses are being summed in both summing networks and will appear across the load resistors 139 and 212. The summed output signal in the case when the A— and C— signal pulses have the relation exhibited by FIGURES 13g and 13h will be that of 13i wherein it can be appreciated that there is a negative going signal pulse having a time duration, for example, of one unit, followed by a second positive going pulse having a time duration of three units. The negative going portion of the composite signal will have no effect on the gating transistor 216 since it is biased to respond only to positive going signal pulses but it will gate open the gating transistor 141. Due to the inversion occurring in the gating transistor 141 the negative going pulse will be inverted to produce a positive charge on the charging capacitor 153 so as to result in charging it positively to a value of V+1, for example, as shown in FIGURE 13j of the drawings. Thereafter, the three unit positive going pulse occurs, and while it will have no effect on the transistor 141, it will gate on the transistor 216 for a three unit period. This will result in charging the integrating capacitor 153 negatively from the V+1 level for three units back down to the V—2 level. As a consequence, it can be appreciated that the ultimate charge of the integrating capacitor 153 produces the voltage that will be sampled by the readout amplitude selector as will be described more fully hereinafter, and will attain a value dependent on the time durations of A— and C— signal pulses of the phase relations of the pulses, and hence irrespective of the skew of the strip of material being gaged. Since the time durations of the A— and C— signal pulses will be affected equally by any skew of the strip, the width differential signal remains the same. In the event that the C— signal pulse should trail the A— signal pulse, the reverse situation would occur where the integrating capacitor might be charged to a negative V—3 potential and thereafter returned to the V—2 level by the positive going charge supplied through the gating transistor 141. In either eventuality, it can be appreciated that the gating transistor 141 serves to negate the effect of improper phase relations between the two signal pulses so as to overcome any error that might be introduced by reason of skew in the strip of material 13 being gaged. It can also be appreciated that as the width of the strip of material 13 along the gaging line C increases, that the time duration of the C— signal pulses will increase so that the time duration of the positive going gating pulses applied to the gating transistor 216 will become progressively smaller as pointed out above. As a result of this progressive decrease in time duration of the charging pulses, the negative potential to which the integrating capacitor 153 will be charged will decrease the value V—2 to some predetermined intermediate value representative of a desired width differential between the gaging lines C and A. The manner in which this predetermined potential operates to develop an output front end cut signal in the readout amplitude selector will be pointed out more fully hereinafter.

The negative potential built up across the integrating capacitor 153 for each set of A— and C— signal pulses is supplied over a conductor 155 to the base electrode of a PNP junction gating transistor 156. The transistor 156 has its collector electrode connected directly to an output terminal 157 from which the front end cut signal pulses may be derived and has its emitter electrode connected directly to the collector electrode of a second PNP junction transistor 158. The transistor 158 has its base electrode connected through a dropping resistor to input terminal 159 that is connected to the source of F— pulses being supplied by the F amplifier 41 in the scanning head assembly, with a proper operating bias being supplied to the base electrode through a biasing resistor connected to the positive 15 volt supply. The emitter electrode of the transistor 158 is connected to a voltage dividing network formed by three resistors connected in series between ground and the source of −25 volts with the middle resistor 161 being variable, and having the variable tap thereof coupled to ground through a by-pass capacitor. By this arrangement, the transistor 158 is biased to be normally non-conducting, however, upon the occurrence of an F− signal pulse, the transistor 158 is gated on so in effect the operating bias is supplied to the emitter electrode of transistor 156. As a consequence, each F− gating pulse enables the transistor 156 so that in the event a negative potential is applied thereto from the integrating capacitor 153, the transistor 156 will be rendered conductive, and will supply an output gating pulse to the output terminal 157.

It is to be understood that the above operation occurs for each passage of one of the viewing lens 14 contained in the scanning head assembly across the width of the strip of material 13 being gaged. For this reason, it is necessary that the capacitor 153 be discharged after each sampling by the F− gating pulses of the transistor 156. For this purpose, the reset pulse generator indicated as 52 of FIGURE 8 is provided. The reset pulse generator comprises a first transistor 161 having its base electrode connected to the source of F− gating pulses supplied by the F amplifier 41 in the scanning head assembly 11. Transistor 161 has its collector electrode connected directly to the source of −25 volts, and has its emitter connected to a biasing network formed by a capacitor and a pair of series connected resistors that are coupled between ground and a source of positive 15 volts. This biasing network is also connected through a resistor 162 to the base electrode of a second gating transistor 163 which has its emitter electrode connected directly to ground, and has its collector electrode connected directly to the charging capacitor 153. By reason of this arrangement upon the occurrence of the F− pulse which simultaneously reads out the gating transistor 156, the gating transistor 161 is turned on and results in applying a negative voltage spike through the resistor 162 to the base electrode of the gating transistor 163. Upon gating transistor 163 being rendered conductive, the capacitor 153 is discharged to ground so that the capacitor is maintained at ground potential in a readiness condition for the next charge to be applied thereto by the transistor 141. As explained in connection with the functional block diagram of FIGURE 8, during operation of the crop shear detector the readout transistor 156 is continuously sampling the potential of the charging capacitor 153 in the previously described manner. Initially, where the leading edge of the strip of material being gaged is quite pointed or very narrow, the negative potential appearing across the capacitor 153 will be relatively large as previously mentioned. However, as more and more of the leading edge of the strip of material 13 comes wtihin the view of the photo-transistor viewing line C in FIGURE 1 the pulse duration or width of the C− pulses being applied across resistor 138 increases so that the voltage being applied to the charging capacitor 153 by the gating transistor 141 becomes less and less negative. Eventually, the magnitude of the potential being built up across the charging capacitor 153 is not sufficient to render the readout transistor 156 conductive so that no gating pulse appears at the output terminal 157. As previously mentioned in connection with the functional block diagram of FIGURE 8, upon this occurrence, the readout AND gate 53 is enabled so that a normal front end readout cut signal will be developed by the circuitry and supplied to the cropping mechanism associated with the detector.

Figure 12:
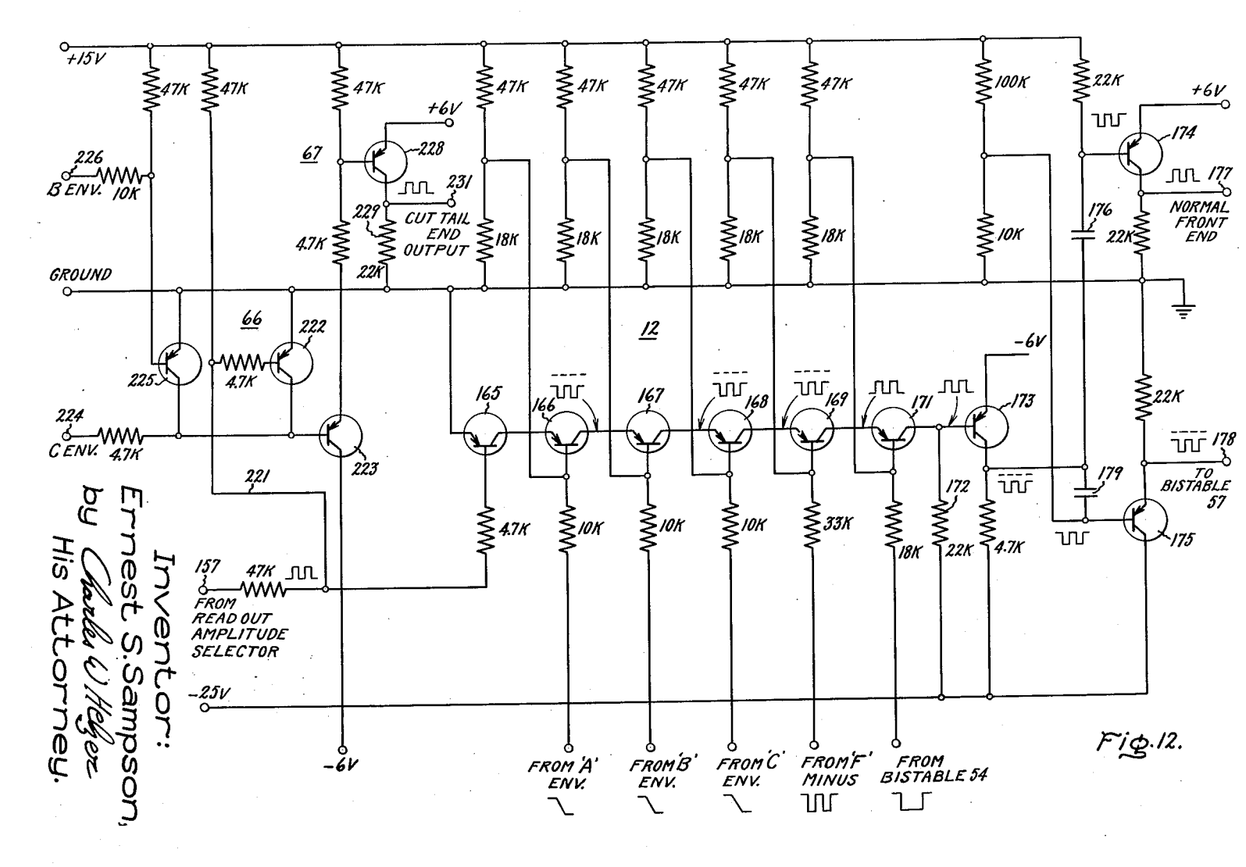
FIGURE 12 is a schematic circuit diagram of a readout amplitude selector comprising a part of the electronic circuitry of the crop shear detector as illustrated in the functional block diagram of FIGURE 8.

The gating pulses supplied from the readout amplitude selector are applied to the readout AND gate 53 whose details of construction are shown in FIGURE 12, and in particular, are applied through the input terminal 157 to the base electrode of a transistor 165 comprising a part of AND gate 53. Transistor 165 has its emitter connected directly to ground, and has it collector electrode connected directly to the emitter electrode of a succeeding transistor 166. Transistor 166 has its base electrode connected to the A envelope output terminal of the A amplifier 41, and has operating biasing potentials applied to the base electrode thereof from a voltage divider network connected across a source of positive 15 volts and ground. The collector electrode of the transistor 166 is connected to the emitter electrode of a third transistor 167 which has its base electrode connected to the source of B envelope signals from the output of the B amplifier 41 in the scanning head assembly 11, and has proper biasing signals potentials applied to its base electrode from a voltage divider connected between the source of +15 volts and ground. The collector electrode of the transistor 167 is connected to the emitter electrode of a fourth transistor 168 having its base electrode connected to the C envelope output terminal of the C amplifier 41. Proper biasing potentials are applied to the base electrode of the transistor 168 from a voltage dividing resistive network connected between the source of positive 15 volts and ground. The gate 12 further includes a transistor 169 having its emitter electrode connected directly to the collector electrode of the transistor 168, and having its base electrode connected to the source of F− gating pulses. Proper biasing potentials are supplied to the base electrode of the transistor 169 from a fourth voltage dividing resistor network connected between the source of positive 15 volts and ground. The transistor 169 in turn has it collector electrode connected directly to the emitter electrode of still another transistor 171 that has its base electrode connected to the output terminal of the bistable multivibrator 54 shown in block diagram form in FIGURE 8. Because the bistable 54 is of conventional construction, its circuit details have not been disclosed. For a detailed description of a suitable bistable multivibrator for use as this element, reference is made to the above identified Millman and Taub textbook, and particularly to chapter 5 thereof. The transistor 171 has its collector electrode connected through load resistor 172 to the source of −25 volts, and connected directly to the base electrode of an output transistor 173. The transistor 173 has its emitter electrode connected directly to a source of −6 volts, and has its collector electrode connected through a load resistor to the source of −25 volts. Output potentials from the gating circuit thus formed are supplied through a pair of output stages formed by a transistor 174 and a transistor 175. The transistor 174 has its emitter electrode connected directly to a source of positive 6 volts, and has its collector electrode connected through a load resistor to ground. The desired normal front end cut signal derived through the gating circuit 12 is obtained across the load resistor of the transistor 174, and supplied through the output terminal 177 to the cropping mechanism associated with the crop shear detector. The base electrode of the transistor 174 has biasing potentials supplied thereto through a biasing resistor connected to the positive 15 volt supply, and has the output gating signals supplied thereto through a coupling capacitor 176 that is coupled to the load resistor of the output transistor 173 in gating circuit 53. The transistor 175 similarly has its emitter electrode connected through a suitable load resistor to ground, and to an output terminal 178 that is connected to the alarm circuitry. The collector electrode of transistor 175 is connected directly to a source of −25 volts. The base electrode of transistor 175 is connected to a voltage dividing resistor network for supplying operating bias to the base, and is coupled through a coupling capacitor 179 to the load resistor of the output transistor 173. By this arrangement, output gating pulses which appear across the load resistor of the transistor 173, are coupled through the coupling capacitors 179 and 176 to each of the output transistors 175 and 174. These transistors then serve as output gating transistors to supply the normal front end cut signal to the cropping mechanism associated with the gage, and to supply a turn off potential to the bistable multivibrator 57 shown in the functional block diagram in FIGURE 8 of the drawings for turning off this bistable in accordance with the philosophy of the circuit.

In operation, the readout amplitude selector shown in FIGURE 11 of the drawings supplies readout gating pulses through the input terminal 157 to the gating transistor 165. These readout gating pulses will be in synchronism with the F— gating pulses supplied to the transistor 169 since the readout gating pulses have been read out by the F— pulses in the circuit arrangement shown in FIGURE 11. Referring to FIGURE 1 of the drawings it can be appreciated that as the sheet of material 13 progresses through the viewing area of the scanning head assemby the A, B, and C envelope signals will appear in sequence. These envelope signals are then applied as enabling potentials to the transistors 166, 167, 168 as they appear. Accordingly, as each envelope first appears it will enable its repsective gating transistor thereby opening a conductive path for the readout gating pulses to the F— transistor 169. Since the C envelope signal turns on the bistable multivibrator 54, an enabling potential will have been supplied to the transistor 171 from bistable 54 so that this transistor will be in a conducting condition. It should be noted that the readout gating pulses being read out from the readout amplitude selector through the input terminal 157 are positive going so that the transistor 165 (which is biased normally on in the absence of the readout pulses) is cut off by the readout pulses. Conversely, the F— pulses supplied to the transistor 169 are negative going so that these pulses will render the normally cut off transistor 169 conductive and since the readout signal pulses are in synchronism with the F— signal pulses supplied to the transistor 169, the effect of these two signals will negate each other for as long as both signals are supplied to the gating circuit 12. However, upon termination of the readout signal pulses supplied to the input terminal 157 of transistor 165 in the previously described manner, the F— gating pulses supplied to the transistor 169 will be transmitted through the gating transistors to the base electrode of the transistor 173 to develop an output front end cut signal across its load resistor. This output front end cut signal is then supplied through the coupling capacitors 176 and 179 to the output coupling transistors 174 and 175, and supplied to the normal front end cut signal terminals of the cropping mechanism associated with the gage, and to the bistable multivibrator 57 of the alarm circuitry, respectively.

The bistable multivibrator 57, the AND gate 58, alarm pulse generator 59, and alarm output circuit 61 are all of conventional construction and any suitable arrangement can be used for these elements. Hence the details of construction of these elements have not been disclosed or illustrated. Wtih respect to the auxiliary front end readout generator 62 however, it is shown in the middle portion of the circuit diagram of FIGURE 10 of the drawings. The auxiliary front end readout signal generator comprises a transistor 181 having its emitter electrode connected directly to a source of positive 6 volts, and its collector electrode connected through a suitable load resistor to ground. The base electrode of the transistor 181 is connected through a dropping resistor to a differentiating circuit formed by a pair of resistors 182 and 183 connected between ground and a source of positive 15 volts with the juncture of the two resistors being coupled through a capacitor 184 to the D envelope input terminal indicated at 185. By this arrangement upon the appearance of a D envelope signal at the output of the D amplifier 41 in the scanning head assembly, the D envelope signal will be differentiated by the differentiating circuit formed by the resistors 182 and 183 and capacitor 184 to produce a negative going voltage spike that is applied to the base electrode of the transistor 181. This voltage spike will then produce a positive going trigger signal across the load resistor of the transistor 181 which is supplied through an output terminal 186 to the associated cropping mechanism connected to the output of the crop shear detector gage. In the event a normal front end cut signal has already been produced and supplied to the cropping mechanism through the output terminal 177 shown in FIGURE 12, the auxiliary front end cut signal supplied through the terminal 186 will have no effect on the cropping mechanism.

Trailing End Cut Signal Generation

As best shown in the functional block diagram of FIGURE 8 of the drawings, the circuitry for developing a trailing end cut output signal includes a gating circuit 63 for developing a prepare for trailing end output signal. The details of this gating circuitry 63 are shown on the right hand portion of FIGURE 10 of the drawings, and includes a PNP junction transistor 191. The D envelope signal is applied to the base electrode of transistor 191 through a conductor 192 connected to the D envelope output terminal of the D amplifier 41. The collector electrode of transistor 191 is connected directly to a source of —6 volts, and the emitter electrode is connected through a voltage biasing network comprised by a pair of resistors 193 and 194 to a source of positive 15 volts. Upon the D envelope signal applied over conductor 192 being allowed to become effective, transistor 191 becomes conductive and produces a negative going voltage pulse across the biasing resistors 193 and 194 which is supplied through an output terminal 195 to the next successive element in the crop shear detector circuit, namely, the AND gate 65. The base electrode of the transistor 191 is normally inhibited however by a second transistor 196 which has its collector electrode connected to the base electrode of transistor 191, and has its emitter electrode connected directly to ground. The base electrode of the transistor 196 is connected through a biasing network formed by a pair of series resistors connected between the source of positive 15 volts, and the remaining terminal connected to the A envelope output terminal of the A amplifier 41. By this arrangement, as long as there is no A envelope signal present, the base electrode of the transistor 196 will be biased positively so that this transistor is maintained non-conductive and has no effect upon circuit performance. However, as long as an A envelope signal is available, the base electrode of transistor 196 will be conductive, and clamps the base electrode of transistor 191 to ground. As a consequence, even though the D envelope signal might be present on conductor 192, since the base electrode of transistor 191 is clamped to ground it will have no effect in switching this gating transistor on. However, as soon as the A envelope signal is removed, the clamp will be removed, and the gating transistor 191 will open and provide a negative enabling potential to the output terminal 195. This potential is then supplied to the AND gate 65 which is the next element in the functional block diagram shown in FIGURE 8. Additionally, upon the gating transistor 191 being rendered conductive, the negative going voltage pulse is applied to the base electrode of a third transistor 197. Transistor 197 has its collector electrode connected through a load resistor to ground, and has its emitter electrode connected directly to a source of positive 6 volts. This third transistor 197 serves to invert the negative going voltage pulse appearing across the resistor 193, to a positive going voltage pulse which is applied to an output terminal 198 for use by the cropping mechanism associated with the crop shear detector. This positive going voltage pulse serves as a prepare for trailing end output signal, and functions to condition the cropping mechanism so that it will be able to use the trailing end cut output signal upon its appearance.

Referring again to FIGURE 11, the prepare for trailing end output signal supplied through terminal 195 is applied across a limiting resistor 201 to the base electrode of a gating transistor 202 which comprises a part of the AND gate 65. The transistor 202 receives a positive bias from a biasing resistor connected between its base electrode and the source of positive 15 volts. It has its emitter electrode connected directly to the collector electrode of a second gating transistor 203, and its collector electrode connected through a load resistor to source of −25 volts. The second transistor 203 in AND gate 65 has its emitter electrode connected directly to ground, and has its base electrode connected through a load resistor 204 to the source of E− input signals applied to an input terminal 205. Suitable biasing potentials are applied to the base electrode of the gating transistor 203 through a resistor connected between the base electrode of transistor 203 and a source of positive 15 volts. By this arrangement, it can be appreciated that upon the prepare for trailing end readout signal being applied to the input terminal 195, the transistor 202 will become conductive. Upon the appearance of the E− signal pulses at the input terminal 205 applied to the base electrode of the gating transistor 203, the E− gating signal pulses will be developed across the load resistor 207. These E− gating signal pulses are then applied along with the C− signal pulses to the respective summing networks in the comparison circuits 47 and 48 formed by transistors 141 and 216. The comparison circuits 47 and 48 function in precisely the same manner described in connection with the front end cut signal operation to develop a trailing end cut signal from the E− and C− signals with one exception. The exception is that the composite signal such as shown at FIGURE 13c derived by summing the E− and C− signals increases from some minimum value initially obtained where the trailing end as seen along line C in FIGURE 1 is almost as wide as the reference width being viewed along line E to some predetermined larger negative value sufficient to trigger the amplitude selector circuit as more and more of the tapered trailing edge comes into view along line C. Upon reaching this predetermined value, the integrating capacitor 153 will be charged sufficiently negative to fire the transistor 156 in the readout amplitude selector circuit in the before described manner to develop a trailing end cut output signal. In the event that the strip 13 being gaged is skewed, the circuit will nevertheless function in the manner outlined in connection with FIGURE 13 (subject to the exception noted above) to develop the desired trailing end cut output signal.

The trailing end cut output signal developed by the readout amplitude selector 51 is supplied to the trailing end output gating circuits 66 and 67 shown in the upper left hand corner of FIGURE 12 of the drawings. The cut trailing end output signal is supplied through the input terminal 157 across a conductor 221, and applied to the base electrode of a gating transistor 222. The base electrode of the transistor 222 has operating potentials supplied thereto through a biasing resistor connected to the positive 15 volts supply, and has its emitter electrode connected directly to ground. The collector electrode of transistor 222 is connected directly to the base electrode of a second transistor 223, and is connected through a dropping resistor to an input terminal 224 to which the C envelope output of the C amplifier is connected. The base electrode of transistor 223 is also connected directly to the collector electrode of a clamping transistor 225 having its emitter electrode connected directly to ground, and having its base electrode connected through a dropping resistor to an output terminal 226 that has the B envelope output of the B amplifier 41 connected thereto. Proper operating bias is supplied to the base electrode of the clamping transistor 225 from a biasing resistor connected to the positive 15 volt supply. By this arrangement, as long as the B envelope signal is available at the input terminal 226, the transistor 225 will be rendered conductive, and will serve to clamp the base electrode of the gating transistor 223 to ground so that no signals can be supplied therethrough. After the strip of material 13 being gaged is past the viewing line B so that B envelope signal potential is no longer available then the B envelope signal will be re-moved thereby removing the clamp 225. At this point the C envelope signal pulses applied to the input terminal 224 will enable the gating transistor 223 so that the cut trailing end output signal can be supplied through the gating transistor 223. Gating transistor 223 has its collector electrode connected directly to a source of −6 volts, and has its emitter electrode connected through a pair of biasing resistors to the source of positive 15 volts. The junction of the pair of biasing resistors connected in the emitter electrode circuit of transistor 223 is connected directly to the base electrode of a phase reversing transistor 228 having its emitter electrode connected through an output load resistor 229 to ground, and having its emitter electrode connected directly to a source of positive 6 volts. Assuming the conditions previously set forth, the cut trailing end output signal being supplied through the gating transistors 222 and 223, will turn the output transistor 228 on and off to produce a cut trailing end output signal that is supplied through the terminal 231, and is applied to the cropping mechanism connected to and operated by the gage.

From the foregoing description it can be appreciated that the invention provides a new and improved non-contacting electro-optical crop shear gage for viewing and cropping the ends of strip material at desired points as the same moves along a production line without requiring that the strip be stopped. The crop shear gage thus provided is adapted for measuring high temperature materials and is extremely accurate in operation as well as relatively insensitive to changes in strip temperature, the velocity of strip, sidewise motion of the strip, or skew of the strip as it moves along the production line. It is believed obvious that other modifications and variations of the invention are possible in the light of the above teachings. It is therefore to be understood that changes may be made in the particular embodiment of the invention described which are within the full intended scope of the invention as defined by the appended claims.

What I claim as new and desire to secure by Letters Patent of the United States is:

1. A crop shear detector comprising electro-optical means for viewing a strip of material being gaged and developing a plurality of simultaneous electric signals representative of the width of the material being gaged at different points along its length, and comparison circuit means operatively coupled to the output of said electro-optical means for comparing the electric signals representing the widths of the material at at least two different points along its length and for deriving an output electric signal representative of the difference.

2. The combination set forth in claim 1 further characterized by a gating circuit operatively coupled to the output of said comparison circuit means and having a number of said plurality of electric signals supplied thereto as enabling potentials for gating open said gating circuit in response to the material being gaged arriving at a predetermined position.

3. The combination set forth in claim 1 further characterized by an alarm circuit operatively coupled to the output of said comparison circuit means and to said electro-optical means and inhibited by said comparison circuit means whereby failure of said comparison circuit means to develop an output signal will cause said alarm circuit to be actuated.

4. A shear detector comprising electro-optical means for viewing a strip of material being gaged and simultaneously developing a plurality of electric signals representative of the width of the material being gaged at different points along its length, a comparison circuit operatively coupled to the output of said electro-optical means, a first input circuit coupled to said comparison circuit for supplying electric signals thereto representative of the width of material being gaged at the leading edge and at a reference point and for deriving an output electric signal representative of the difference, a second input circuit coupled to said circuit for supplying electric signals representative of the width of the material being gaged at the trailing edge and at a reference point and to derive an output electric signal representative of the difference, and output circuits coupled to comparison circuit for developing a front end cut signal and a trailing end cut signal from said respective difference signals.

5. The combination set forth in claim 4 wherein said output circuits comprise a pair of gate circuits coupled to the output of said comparison circuit with each of said gate circuits having at least one of said plurality of electric signals supplied thereto as an enabling potential for enabling said output gates upon the material being gauged reaching a predetermined position.

6. A shear detector comprising electro-optical means for viewing a strip of material being gaged and developing a plurality of electric signals representative of the width of the material being gaged at different points along its length, a bistable multivibrator having its inputs connected to at least two of the sources of said plurality of electric signals representing the beginning and end of the material being gaged for turning said bistable on and off at a particular point in the passage of the material through the gage, a gating circuit coupled to the output of said bistable multivibrator and having the one of said plurality of electric signals representing the width at the leading edge of the material being gaged supplied thereto, a second bistable multivibrator having its inputs connected to at least two of the sources of said plurality of electric signals representing the beginning and end of the material being gaged, a second gating circuit coupled to the output of said second bistable multivibrator and having the one of said plurality of signals representing the width of the trailing edge of the material being gaged supplied thereto, a comparison circuit coupled to the output of said first gating circuit for comparing the electric signals representative of the width of the material being gaged at the leading edge and at a reference point and for deriving an output signal representative of the difference, said comparison circuit also being coupled to the output of said second gating circuit for comparing the electric signals representative of the width of the material being gaged at the trailing edge and at a reference point and for deriving an output electric signal representative of the difference, an integrating device coupled to the output of said comparison circuit, and readout gating circuit means coupled to and selectively actuated by the integrating device.

7. The combination set forth in claim 6 further characterized by a readout gating circuit operatively coupled to the output of said integrating device and having a number of said plurality of electric signals supplied thereto as enabling potentials for gating open said gating circuit in response to the material being gaged arriving at a predetermined position, an alarm circuit operatively coupled to the output of said readout gating circuit and to said electro-optical means and inhibited by the front end cut output signal produced by said readout gating circuit whereby failure of said circuit to produce an output signal causes said alarm signal to be actuated, and an auxiliary front end cut signal generator operatively coupled to the output of said electro-optical means for actuation by said means in the event no front end cut signal is produced by the front end cut signal comparison circuitry.

8. The combination set forth in claim 6 further characterized by a readout gating circuit operatively coupled to the output of said integrating device and having a number of said plurality of electric signals supplied thereto as enabling potentials for gating open said gating circuit in response to the material being gaged arriving at a predetermined point.

9. A shear detector comprising electro-optical means for viewing a strip of material being gaged and developing a plurality of electric signals representative of the width of the material being gaged at different points along its length, a bistable multivibrator having its inputs connected to at least two of the sources of said plurality of electric signals representing the beginning and end of the material being gaged for turning said bistable on and off at a particular point in the passage of the material through the gage, a gating circuit coupled to the output of said bistable multivibrator and having the one of said plurality of electric signals representing the width at the leading edge of the material being gaged supplied thereto, a comparison circuit coupled to the output of said first gating circuit and comprising first and second resistive summing networks having the one of said plurality of signals applied thereto which represents the width of the material being gaged at the leading edge and having another of said plurality of signals supplied thereto representing the width at a reference point, a gating device coupled to each summing network with one of said gating devices being biased to respond to positive going signals and the other of said gating devices being biased to respond to negative going signals, an integrating device coupled to said last mentioned gating devices, the gating devices serving to couple the output of said summing networks to said integrating device upon the differential of the two signals supplied to said summing networks reaching a predetermined magnitude, and a readout gating device coupled to the output of said integrating device and to a source of sampling signals for periodically sampling the potential on said integrating device and reading it out upon the potential reaching a predetermined value.

10. The combination set forth in claim 9 further characterized by a second bistable multivibrator having its inputs connected to at least two of the sources of said plurality of electric signals representing the beginning and end of the material being gaged, and a second gating circuit coupled to the output of said second bistable multivibrator and having the one of said plurality of signals representing the width of the trailing edge of the material being gaged supplied thereto, said comparison circuit being coupled to the output of said second gating circuit and having the one of said plurality of electric signals representing the width of the material at the trailing edge applied thereto along with another of the plurality of electric signals representing the width of the material at a reference point.

11. A comparison circuit comprising first and second resistive summing networks having a first one of a plurality of signals applied thereto which represents the width of a material being gaged at the leading edge and having another of said plurality of signals supplied thereto representing the width at a reference point, a gating device coupled to each of said summing networks with one of said gating devices being responsive to positive going signals and the other of said gating devices being responsive to negative going signals, an integrating device coupled to said gating devices, the gating devices serving to couple the output of said summing networks to said integrating device, and a readout gating device coupled to the output of said integrating device and to a source of sampling signals for periodically sampling the potential of said integrating device and reading it out upon the potential reaching a predetermined value.

12. A comparison circuit comprising first and second resistive summing networks having a first one of a plurality of signals applied thereto which represents the width of a material being gaged at the leading edge and at the trailing edge and having another of said plurality of signals supplied thereto representing the width at a reference point, a gating device coupled to each of said summing networks with one of said gating devices being responsive to positive going signals and the other of said gating devices being responsive to negative going signals, and integrating device coupled to said gating device, the gating devices serving to couple the output of said summing networks to said integrating device upon the differential of the two signals supplied to said summing networks reaching a predetermined magnitude, a readout gating device coupled to the output of said integrating device and to a source of sampling signals for periodically sampling the potential on said integrating device and reading it out upon the potential reaching a predetermined value, and a pair of output gates coupled to said readout gate for developing respective front end cut and trailing end cut signals.

References Cited in the file of this patent
UNITED STATES PATENTS

| | | |
|---|---|---|
| 2,451,816 | Dunn | Oct. 19, 1948 |
| 2,674,915 | Anderson | Apr. 13, 1954 |
| 2,803,755 | Milford | Aug. 20, 1957 |
| 2,812,447 | MacMartin et al. | Nov. 5, 1957 |
| 2,886,718 | Shepherd et al | May 12, 1959 |
| 2,939,963 | Rideout | June 7, 1960 |
| 2,945,414 | Blackstone | July 19, 1960 |